US012649351B2

(12) United States Patent
Quix et al.

(10) Patent No.: US 12,649,351 B2
(45) Date of Patent: Jun. 9, 2026

(54) THERMAL MANAGEMENT SYSTEM WITH SECONDARY CIRCUIT

(71) Applicant: Ford Global Technologies, LLC, Dearborn, MI (US)

(72) Inventors: Hans Guenter Quix, Herzogenrath (DE); Jan Mehring, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 220 days.

(21) Appl. No.: 18/493,146

(22) Filed: Oct. 24, 2023

(65) Prior Publication Data

US 2024/0140166 A1 May 2, 2024

(30) Foreign Application Priority Data

Oct. 28, 2022 (DE) .......................... 102022128613.4

(51) Int. Cl.
B60H 1/00 (2006.01)

(52) U.S. Cl.
CPC ..... B60H 1/00385 (2013.01); B60H 1/00278 (2013.01); B60H 1/00914 (2013.01); B60H 2001/00307 (2013.01); B60H 2001/00928 (2013.01); B60H 2001/00949 (2013.01)

(58) Field of Classification Search
CPC ............ B60H 1/00385; B60H 1/00278; B60H 1/00914; B60H 1/143; B60H 1/32; B60H 2001/00307; B60H 2001/00928; B60H 2001/00949; B60L 58/26; B60L 58/27

See application file for complete search history.

(56) References Cited

U.S. PATENT DOCUMENTS

| | | | |
|---|---|---|---|
| 8,336,319 B2 | 12/2012 | Johnston et al. | |
| 2019/0351732 A1 | 11/2019 | Rajaie et al. | |
| 2020/0369108 A1* | 11/2020 | Kim ................... | B60H 1/32284 |
| 2022/0089000 A1* | 3/2022 | Kim ....................... | B60H 1/143 |
| 2022/0396117 A1* | 12/2022 | Kim ....................... | B60H 1/323 |
| 2023/0356566 A1* | 11/2023 | Kim ..................... | B60H 1/3213 |
| 2024/0066941 A1* | 2/2024 | Alkhulaifi ............... | B60L 58/26 |

* cited by examiner

*Primary Examiner* — Marc E Norman
(74) *Attorney, Agent, or Firm* — McCoy Russell LLP

(57) ABSTRACT

Methods and systems are provided for a thermal management system for a battery-powered electric vehicle, which system comprises a primary circuit and a secondary circuit, which has at least a first partial circuit having a cooling device, at least a second partial circuit having a heating device, at least a third partial circuit supplying a battery and at least a fourth partial circuit supplying components of the power electronics and passing through a heat exchanger, and the thermal management system further comprises a controller, wherein the primary circuit has at least one indirect evaporator and at least one indirect condenser, a number of pumps are arranged in the system for driving a fluid flow in the partial circuits, and a maximum number of five control valves is controlled in the system for controlling the fluid flow.

19 Claims, 15 Drawing Sheets

THERMAL MANAGEMENT SYSTEM WITH SECONDARY CIRCUIT

CROSS REFERENCE TO RELATED APPLICATION

The present application claims priority to German Patent Application No. 102022128613.4 filed on Oct. 28, 2022. The entire contents of the above-listed application is hereby incorporated by reference for all purposes.

FIELD

The present description relates generally to a thermal management system for a battery-powered electric vehicle, having a plurality of partial circuits in a secondary circuit system which are variable by connection of controllable valves, to a corresponding vehicle and to a method for controlling the thermal management system.

BACKGROUND/SUMMARY

Battery-powered electric vehicles (BEV) use a cooling system for cooling the various components of an electric system. To increase a vehicle travel range, it may be desired to utilized a cooling system with minimal energy consumption. A secondary circuit heat pump system may be used to decrease energy consumption. An intermediate medium may be used to connect a primary circuit to a secondary circuit, which may provide heating or cooling power, to electric drive components of the vehicle, to the vehicle interior and optionally to the surroundings. However, a multi-circuit cooling system may be convoluted in design to achieve different temperatures and to meet different thermal demands. In one example, the multi-circuit cooling valve may include a plurality of valves to achieve different modes or may reduce a number of valves while increasing a construction complexity. Thus, methods and systems alternative to those that already exist may be desired.

In one example, the issues described above may be addressed by a thermal management system for a vehicle including a primary circuit comprising a first chiller, a second chiller, and at least one indirect condenser, a secondary circuit comprising a first partial circuit having a cabin cooling device, a second partial circuit having a cabin heating device, a third partial circuit comprising a battery, and a fourth partial circuit comprising a heat exchange device and power electronics, a plurality of valves arranged in the system including a battery valve, a power electronics valve, a heat exchange device valve, an indirect condenser valve, and a chiller valve; and a controller with instructions stored on memory thereof that allow the controller to: control positions of the plurality of valves to enter one of a plurality of operating states based on a temperature of one or more of the battery, the power electronics, and a cabin interior. In this way, a variety of heating and operating states may be achieved with the low-complexity of the thermal management system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
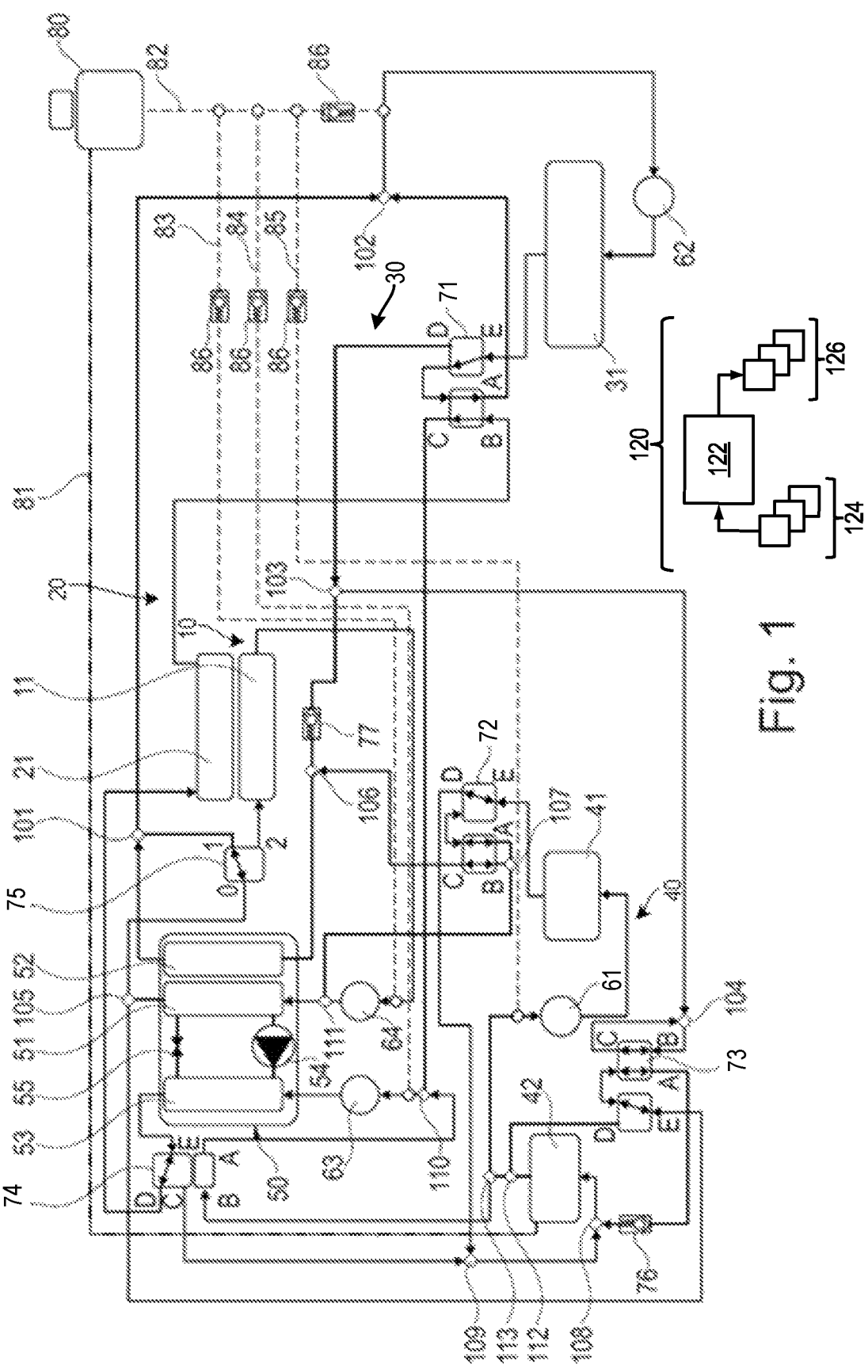
FIG. 1 shows a circuit diagram of an embodiment of a thermal management system, according to an embodiment of the present disclosure.
Figure 2:
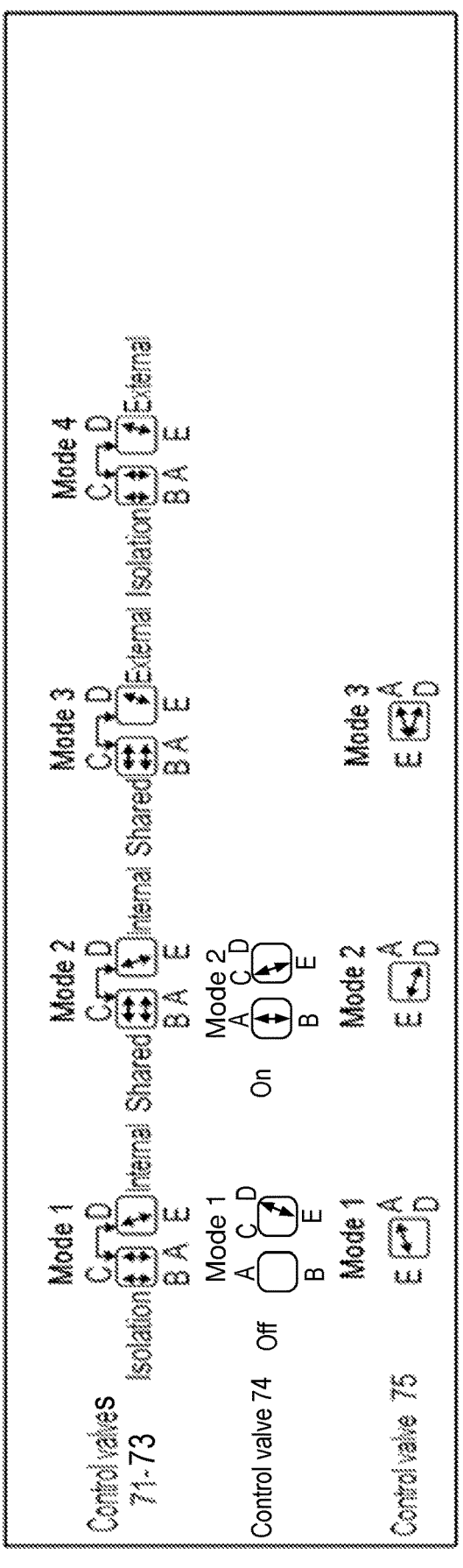
FIG. 2 shows embodiments of the controllable valves used in the circuit diagram, according to an embodiment of the present disclosure.
Figure 3:
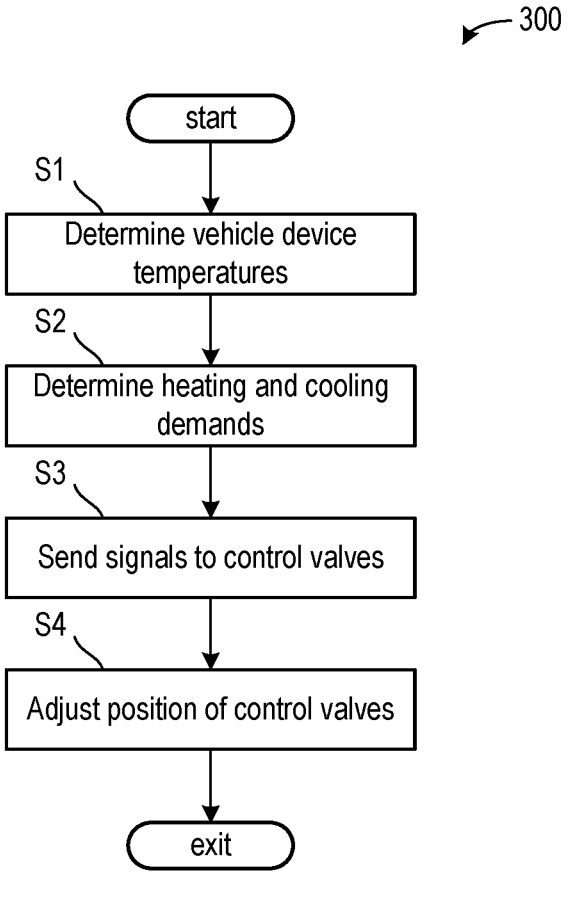
FIG. 3 shows a flows diagram of an embodiment of a method, according to an embodiment of the present disclosure.

The following description relates to systems and methods for a cooling system. FIG. 1 shows a circuit diagram of an embodiment of a thermal management system, according to an embodiment of the present disclosure. FIG. 2 shows embodiments of the controllable valves used in the circuit diagram, according to an embodiment of the present disclosure. FIG. 3 shows a flows diagram of an embodiment of a method, according to an embodiment of the present disclosure. FIGS. 4-15 show different operating modes of the coolant system.

A first aspect of the present disclosure relates to a thermal management system for a battery-powered electric vehicle, which comprises a primary circuit through which refrigerant flows and which has at least one indirect evaporator and at least one indirect condenser, and a secondary circuit which comprises at least a first partial circuit having a cabin cooling device, at least a second partial circuit having a cabin heating device, at least a third partial circuit which passes around a battery, and at least a fourth partial circuit which passes around components of the power electronics and passes through a heat exchange device, and a controller, wherein there are arranged in the system a plurality of pumps for driving a fluid flow in the circuits and a number of controllable valves for controlling the fluid flow in the secondary circuit. A determined number of five controllable valves is arranged in the system. The partial circuits can be connected together by different operating modes of the controllable valves.

The system according to the present disclosure may include a relatively small number of controllable valves compared to a number of operating modes. The design of the system is may further include omitting one or more valves. The system has a lower complexity than comparable systems. As a result, it demands less maintenance and is cheaper to manufacture and assemble.

The present disclosure provides a thermal management system in which the controllable valves are positioned to reduce a number of valves needed while still achieving a desired number of operating modes. Controllable valves are herein valves, the opening and closing modes of which are set by activation via a controller, in contrast to check valves, which function under pressure control and do not have to be actively activated. For simplification, they are here also referred to synonymously as control valves. The valves may be actuated to a fully open position, a fully closed position, or a position therebetween. In one example, the number of valves included in the system is less than a half a number of operating modes.

Both cooling power and heating power can be generated by the primary circuit, the indirect condenser here constitutes the "warm" side and the indirect evaporator (also referred to as a "chiller") constitutes the "cold" side of the primary circuit. In one example, a temperature of coolant in the "warm" side is higher than a temperature of coolant in the "cool" side. The primary circuit is in this respect a structural unit, which is also referred to as a "compact refrigerant system", because refrigerant flows therein. The secondary circuit, in which only coolant flows, is located outside this structural unit in the thermal management system.

The partial circuits are not fixed circuits but are able to be varied by varying the flow via different valve settings. Thus, a portion of a particular partial circuit (that is to say a particular line or plurality of lines) can also become part of a different partial circuit via particular settings of the controllable valves.

The controllable valves are present in two different designs. Two different designs of said valves may allow the system to be controlled so that all the desired thermal modes are achieved. In one example, first, second, third and fourth controllable valves permit five different switching modes, and a fifth controllable valve permits three different switching modes.

In one example, a flow can be directed through the second and/or the third partial circuit in the system by switching the first controllable valve. This arrangement allows the battery and the vehicle interior to be heated, for example at the start of operation of the vehicle, when the partial circuits are connected together by the first control valve, or allows the battery to be cooled and the vehicle interior to be heated when the partial circuits are separated by the first control valve.

In one example, a flow can be directed through the fourth and/or the third partial circuit or through the fourth and/or the first partial circuit in the system by switching the second controllable valve. This switching advantageously allows, for example, the flow to be directed via the heat exchanger for cooling of the battery, while at the same time the vehicle interior can be heated via the second partial circuit (when the fourth and third partial circuits are connected). Furthermore, this switching advantageously allows, for example, the flow to be directed via the indirect evaporator(s) for cooling of the vehicle interior and at the same time cooling of the components of the power electronics via the heat exchanger (when the first and the third partial circuits run through the second control valve but are not connected).

In one example, a flow can be directed through the third and/or the fourth partial circuit in the system by switching the third controllable valve. This switching allows the flow to be directed, for example, for the purpose of effective cooling of the battery.

In one example, the flow can be directed through the second or the fourth partial circuit in the system by switching the fourth controllable valve. In other words, the flow is here directed through either the second partial circuit or the fourth partial circuit. It is thus possible to direct the flow for heating or cooling of power electronics and/or for heating of the vehicle interior.

In one example, the flow can be directed through the first or the fourth partial circuit in the system by switching the fifth controllable valve. In other words, the flow is here directed through either the first partial circuit or the third and/or fourth partial circuit. Cooling or heating of the vehicle interior and of the battery can thus advantageously be controlled.

A second aspect of the present disclosure relates to a vehicle having a thermal management system.

A third aspect of the present disclosure relates to a method for controlling a thermal management system, the method including determining the temperatures in devices of the vehicle comprising the traction battery, components of the power electronics and the vehicle interior, determining the requirements for cooling or heating said devices of the vehicle, sending a control command to actuators of the controllable valves, and switching the controllable valves so that said devices of the vehicle are heated or cooled as demanded.

FIGS. 1 and 4-15 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. It will be appreciated that one or more components referred to as being "substantially similar and/or identical" differ from one another according to manufacturing tolerances (e.g., within 1-5% deviation).

FIG. 1 shows a circuit diagram of an embodiment of a thermal management system 1 according to the present disclosure. The thermal management system 1 is arranged in an electric vehicle, that is to say in an electrically driven vehicle.

The thermal management system 1 has a primary circuit 50 and a secondary circuit; it is therefore also referred to as a secondary circuit system. A refrigerant flows through the primary circuit 50. First and second chillers 51, 52 (also referred to as indirect evaporators) and an indirect condenser 53 (also referred to as iCond) are arranged in the primary circuit 50. The first chiller 51 is connected via a line to a compressor 54. The first chiller 51 is further fluidly coupled to the indirect condenser 53 via a line having a restrictor 55. The indirect condenser 53 may be configured to provide warmer temperatures and the chillers 51 and 52 to provide cooler temperatures. The primary circuit 50 is also referred to as a "compact refrigerant system".

The secondary circuit is formed by the partial circuits described below, in which coolant flows. A water-glycol mixture or another expedient coolant known to a person skilled in the art is used as the coolant. Cooling of the cabin (vehicle interior, passenger compartment) is provided via a first partial circuit 10 in which a cooling device 11 for generating the corresponding cooling power is arranged. In one example, the first partial circuit 10 is a cooler circuit. Heating of the cabin is provided via a second partial circuit 20 in which a heating device 21 for generating the corresponding heating power is arranged. In one example, the second partial circuit 20 is a heater circuit.

In the thermal management system 1, a flow passes to a battery 31 via a third partial circuit 30. In one example, the third partial circuit 30 is a battery circuit. The battery 31 is provided for driving the vehicle. Furthermore, a flow passes to components of the power electronics 41 and to a heat exchange device 42 via a fourth partial circuit 40. In one example, the fourth partial circuit 40 is a power electronics circuit. The secondary circuit is thus provided to transmit the cooling or heating power of the primary circuit to the drive components of the vehicle and also to effect the delivery of heat to the vehicle interior and to the surroundings of the vehicle. That is to say, the secondary circuit may include each of the first partial circuit 10, the second partial circuit 20, the third partial circuit 30, and the fourth partial circuit 40.

For generating a flow, a plurality of pumps are arranged in the thermal management system 1. A first pump 61 is arranged upstream of the components of the power electronics 41. A second pump 62 is arranged upstream of the battery 31. A third pump 63 is arranged upstream of the indirect condenser 53. A fourth pump 64 is arranged upstream of the first chiller 51.

A plurality of control valves are arranged in the thermal management system 1, via which valves the flow of coolant for all the relevant modes for cooling or heating especially the battery 31, the components of the power electronics 41 and the vehicle interior (not shown) can be set. A first control valve 71 is arranged downstream of the battery 31. It can be passed through by the third partial circuit 30 and by the second partial circuit 20.

A second control valve 72 is arranged downstream of the components of the power electronics 41. The second control valve 72 may at least partially control the fourth partial circuit 40 and the first partial circuit 10.

A third control valve 73 is arranged downstream of the heat exchange device 42 between the first controllable valve 71 and the heat exchange device 42.

A fourth control valve 74 is arranged downstream of the indirect condenser 53, so that it permits a flow to the heating device 21 or to the heat exchanger 42 depending on its switching. Furthermore, a flow from the heat exchange device 43 to the indirect condenser 53 is possible via the fourth control valve 74.

Herein, upstream and downstream refer to a position of a component with respect to a direction of coolant flow. Thus, a first component upstream of a second component may include where coolant contacts the first component prior to reaching the second component.

The controllable valves 71, 72, 73 and 74 are configured in such a manner that they permit at least five switching modes.

A fifth control valve 75 is arranged downstream of the first chiller 51, so that, depending on its switching, it permits a fluidic connection to the cooling device 11, to the battery 31 or to both the cooling device 11 and the battery 31 at the same time. The fifth control valve 75 is thus configured in such a manner that it permits three switching modes.

The configurations of the plurality of control valves are shown in detail in FIG. 2. The control valves can be divided into two groups based on their configuration. The first through fourth control valves 71-74 may be 5/2-way valves and permit five switching modes; the fifth control valve 75 is configured as a two-way distributor valve and permits three switching modes, providing a total of twelve different operating states with different coolant flow paths.

The first through fourth control valves 71-74 each have in the first path shown on the left an inlet and three ports A, B and C, and in the second path shown on the right an inlet and two ports D and E. In mode 1, the first path is set to isolation and the second path to internal. In mode 2, the first path is set to shared and the second path to internal. In mode 3, the first path is set to shared and the second path to external. In mode 4, the first path is set to isolation and the second path to external. In mode 1 of the fourth control valve 74, the first path is so set that all the ports are closed, and the second path is set to external.

The fifth control valve 75 has an inlet (In) and two outgoing ports 1 and 2. In mode 1, the control valve 75 is set to allow passage from the inlet to port 1, and is thus blocked to port 2. In mode 2, the control valve 75 is set to allow passage from the inlet to port 2, and is thus blocked to port 1. In mode 3, the control valve 75 is set to allow passage from the inlet to both ports 1 and 2. Herein, the first control valve 71 may be referred to as a battery valve, the second control valve 72 may be referred to as a power electronics valve, the third control valve 73 may be referred to as a heat exchange device valve, the fourth control valve 74 may be referred to as an indirect condenser valve, and the fifth control valve 75 may be referred to as a chiller valve.

Returning to FIG. 1, in the thermal management system 1, a first check valve 76 is arranged between the third controllable valve 73 and the heat exchange device 42, and a second check valve 77 is arranged between the first controllable valve 71 and the heat exchange device 42.

The heat exchange device 42 is connected via a first equalizing line 81 to an equalizing container 80. The equalizing container 80 is connected via a second 82, third 83, fourth 84 and fifth equalizing line 85 to the pipes of the circuits of the thermal management system 1. An equalizing line check valve 86 is arranged in each of the equalizing lines 82, 83, 84 and 85.

In the thermal management system 1, the lines are connected at nodes 101, 102, 103, 104, 105, 106, 107, 108, 109, 110, 111, 112, and 113, so that they form branches and junctions at these points. Each node may represent at intersection between lines that illustrates a fluid connection between two or more lines. If a node is not shown, then the two or more lines may not be fluidly coupled. That is to say, lines may be drawn crossing one another, however, if a node is not drawn then the lines are fluidly separated at at least the crossing.

Controller 122 may comprise a portion of a control system 120. Control system 120 is shown receiving information from a plurality of sensors 124 (various examples of which are described herein) and sending control signals to a plurality of actuators 126 (various examples of which are described herein). As one example, sensors 124 may include temperature sensors arranged in each of the primary circuit, the first partial circuit 10, the second partial circuit 20, the third partial circuit 30, the fourth partial circuit 40, and a cabin interior. Other sensors such as pressure, temperature, air/fuel ratio, and composition sensors may be coupled to various locations in the thermal management system and may be embedded in one or more device. As another example, the actuators may pump actuators and valve actuators configured to adjust operating conditions thereof.

The controller 122 receives signals from the various sensors of FIG. 1 and employs the various actuators of FIG. 1 to adjust engine operation based on the received signals and instructions stored on a memory of the controller. For example, adjusting an operating state of the thermal management system may include receiving feedback from the plurality of temperature sensors, comparing the feedback to determined values, and signaling to actuators of the valves and pumps to adjust coolant flow to meet thermal demands of the components fluidly coupled to the thermal management system.

Turning now to FIG. 3, it shows a method 300 for controlling a thermal management system 1 of FIG. 1. Instructions for carrying out method 300 may be executed by a controller based on instructions stored on a memory of the controller and in conjunction with signals received from sensors of the engine system. The controller may employ actuators of the thermal management system to adjust operation, according to the method described below.

In a first step S1 the temperatures in devices of the vehicle comprising the traction battery 31, components of the power electronics 41 and the vehicle interior (not shown) are acquired. The temperatures are determined by corresponding sensors and transmitted to a control device (e.g., controller 122 of FIG. 1).

In a second step S2, the demands for cooling or heating said devices of the vehicle are determined by the control device. If the temperature is higher than a set determined value, it is determined that cooling is demanded. If the temperature is lower than a set determined value, it is determined that heating is demanded. If the temperature corresponds to the set standard value, no change in the temperature is demanded. In one example, a magnitude of heating or cooling may be determined based on a difference between the current temperature and the set determined value. As the difference increases, the magnitude, which corresponds to the heating or cooling demand, increases. In some examples, additionally or alternatively, the set determined value may be a temperature range, wherein heating or cooling is not desired when the current temperature is within the temperature range. If the current temperature is less than a lower value of the temperature range, then heating is desired. If the current temperature is greater than an upper value of the temperature range, then cooling is desired. Each of the set determine value, the lower value, and the upper value are non-zero numbers, in one example.

In a third step S3, control commands are sent by the control device to the controllable valves, which in a fourth step S4 are so set that the coolant heats or cools said devices of the vehicle as demanded.

Different variants of settings of the control valves 70 are described with respect to FIGS. 4-15, and it will be described how the flow in the thermal management system 1 is directed according to the demands for heating or cooling. In each case only the partial circuits through which a flow passes are identified. The first partial circuit 10 is identified by a heavy solid line, the second partial circuit 20 by a broken line, the third partial circuit 30 by a dot-and-dash line and the fourth partial circuit 40 by a dotted line. The solid line is a continuous line free of breaks. Dot-and-dash lines are discontinuous and include dots between dashes, wherein the dots are smaller than the dashes. Furthermore, only the circuits through which coolant is flowing are numerically labeled in FIGS. 4-15. A summary of the different operating states is illustrated in table 1 below.

Figure 4:
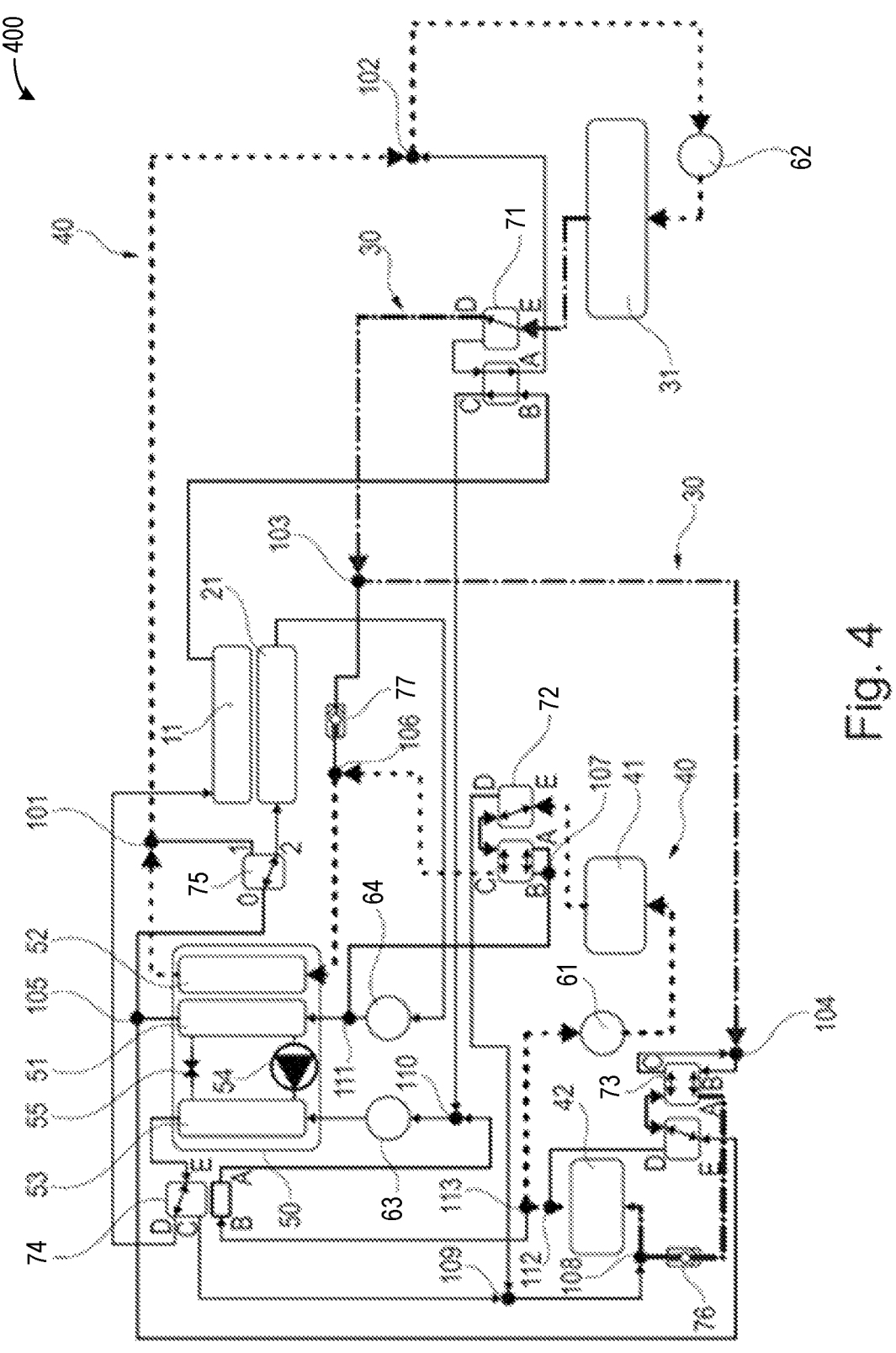
FIG. 4 shows the circuit diagram in a first operating state, according to an embodiment of the present disclosure.

Turning now to FIG. 4, it shows a first operating state 400, in which the battery 31 and the components of the power electronics 41 can be cooled via the heat exchange device 42. In one example, the first operating state 400 includes where a diagnostic is not passed for one or more of the cooling device 11 and a component of the first partial circuit 10. For driving the flow in the system, the first and second pumps 61, 62 are switched on. The first control valve 71 is actuated to mode 4. The second control valve 72 is switched to mode 2. The third control valve 73 is actuated to mode 2. The fourth control valve 74 is actuated to mode 1 and the fifth control valve 75 is actuated to mode 2. In one example, the fourth control valve 74 is fully closed in mode 4 such that all ports are sealed and fluid does not flow therethrough. The flow of coolant thus runs from the heat exchange device 42 to the components of the power electronics 41, via the first pump 61, then through second control valve 72 to the second chiller 52, from there directly to the battery 31, and from there through first and third control valves 71 and 73 to the heat exchange device 42. Cooling of the components of the power electronics 41 is here effected primarily by the heat exchange device 42 and cooling of the battery 31 by the second chiller 52. The cooling device 11 is not active and does not receive coolant in the first operating state 400.

In one example, the first operating state 400 is selected in response a diagnostic of the first partial circuit 10 not being passed. Additionally, the first operating state 400 may be selected when the battery 31 and/or the components of the power electronics 41 demand cooling. The battery 31 may demand cooling when a battery temperature is greater than a first upper battery threshold temperature. The components of the power electronics 41 may demand cooling when its temperature is greater than a first upper power electronics threshold temperature. The first upper battery threshold temperature and the first upper power electronics threshold temperature are based on non-zero, positive numbers.

Figure 5:
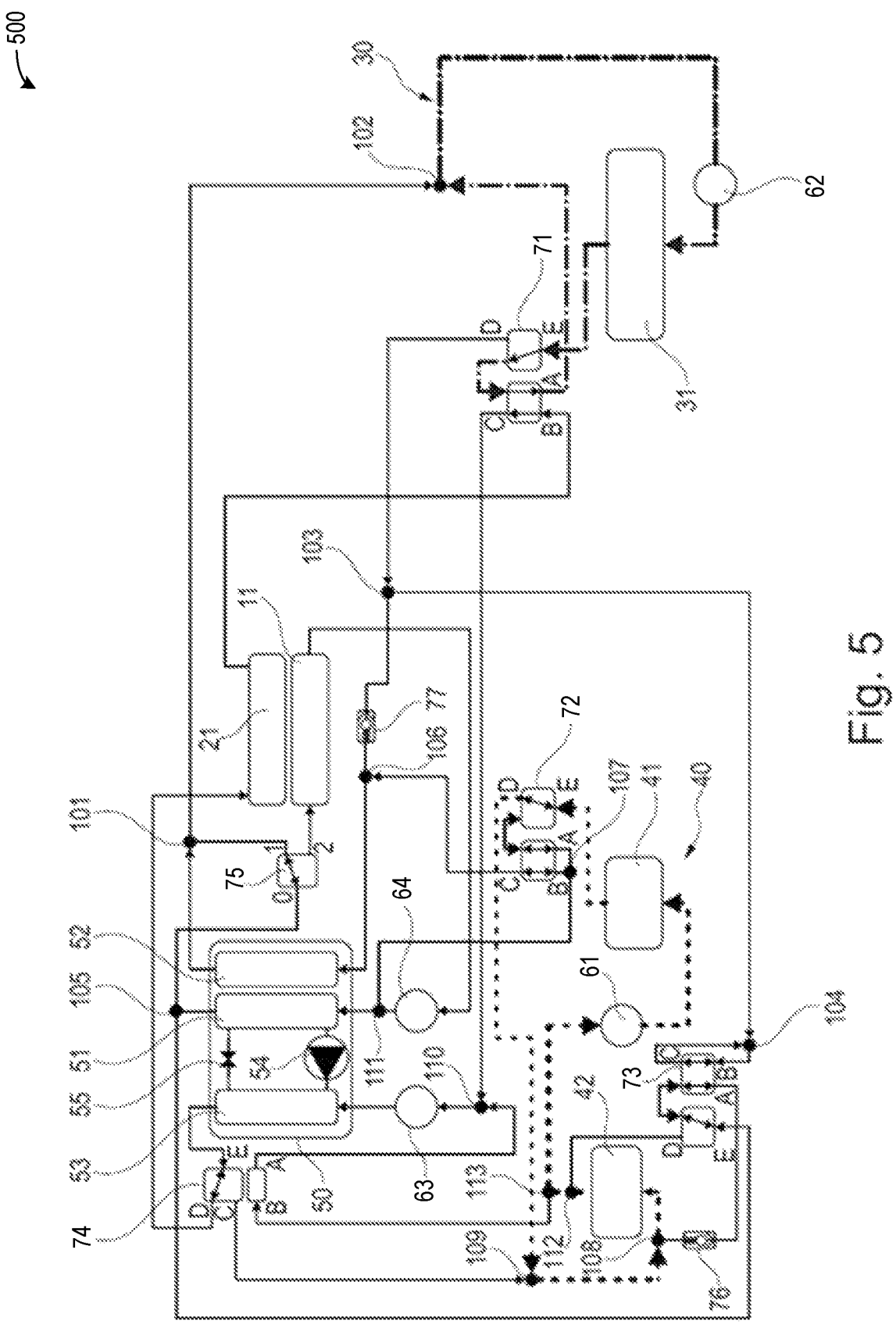
FIG. 5 shows the circuit diagram in a second operating state, according to an embodiment of the present disclosure.

Turning now to FIG. 5, it shows a second operating state 500. The first control valve 71 is actuated into mode 1. The second control valve 72 is actuated into mode 4. The third and fifth control valves 73 and 75 are actuated into a corresponding mode 1. The fourth control valve 74 is actuated into mode 1. A circulating flow of fluid in the third partial circuit 30 around the battery 31 is altered relative to the first operating state 400 of FIG. 4. The second pump 52 is switched on. In addition, a flow passes in the fourth partial circuit 40 to the components of the power electronics 41 and to the heat exchange device 42. Cooling of the components of the power electronics 41 is thus effected by the heat exchange device 42. The first pump 51 is switched on. In one example, the fourth partial circuit 40 is fluidly separated from the third partial circuit 30 during the second operating state 500. Coolant does not flow to the third, fourth, or fifth control valves 72-74. Additionally, coolant does not flow to the third or fourth pumps 63, 64.

The second operating state 500 may be selected in response to a battery temperature being within a desired battery operating temperature range. In one example, a highest value of the desired battery operating temperature range is equal to the first upper battery threshold temperature. As such, the battery may not demand cooling. Additionally, the components of the power electronics 41 may be greater than the first upper power electronics threshold temperature.

Figure 6:
FIG. 6 shows the circuit diagram in a third operating state, according to an embodiment of the present disclosure.

Turning now to FIG. 6, it shows a third operating state 600. The first and second control valves 71, 72 are actuated into mode 4, the third control valve 73 is actuated into mode 1, the fourth control valve 74 is actuated into mode 2, and the fifth control valve 75 is actuated into mode 1. A flow passes through the third partial circuit 30 having the battery 31, wherein the flow is directed from the battery 31, through the first and second control valves 71, 72 to the first and second chillers 51, 52, and from the first chiller 51 via the fifth control valve 75 and from the second chiller 52 directly back to the battery 31, wherein the line from the first chiller 51 merges downstream of the fifth control valve 75 at the node 101 into the line from the second chiller 52. The flow of coolant is driven by the second pump 62. The battery 31 is cooled by both chillers 51, 52.

Furthermore, a coolant flow additionally passes through the fourth partial circuit 40 comprising the heat exchange device 42 and the components of the power electronics 41. Cooling of the components of the power electronics 41 is thus effected by the heat exchange device 42. The coolant flow is effected by the first pump 61 and the third pump 63, which are switched on. The coolant flow travels from the heat exchange device 42 directly to the components of the power electronics 41 and from there through the second control valve 72 back to the heat exchange device 42. A flow additionally passes through a line that branches downstream of the heat exchange device 42 and that via the fourth control valve 74 to the indirect condenser 53 and from there through the fourth control valve 74 back to the heat exchange device 42 again, wherein the lines from the fourth control valve 74 and the second control valve 72 join upstream of the heat exchange device 42 at the node 112.

In one example, the third operating state 600 may be selected in response to a battery temperature being greater than a second upper threshold battery temperature. In one example, the second upper threshold battery temperature is greater than the first upper threshold battery temperature. As such, a cooling demand of the battery 31 is higher in the third operating state 600 compared to the first operating state 400. As such, both the first and second chillers are used. The indirect condenser 53 may be activated due to operation of the chillers.

Figure 7:
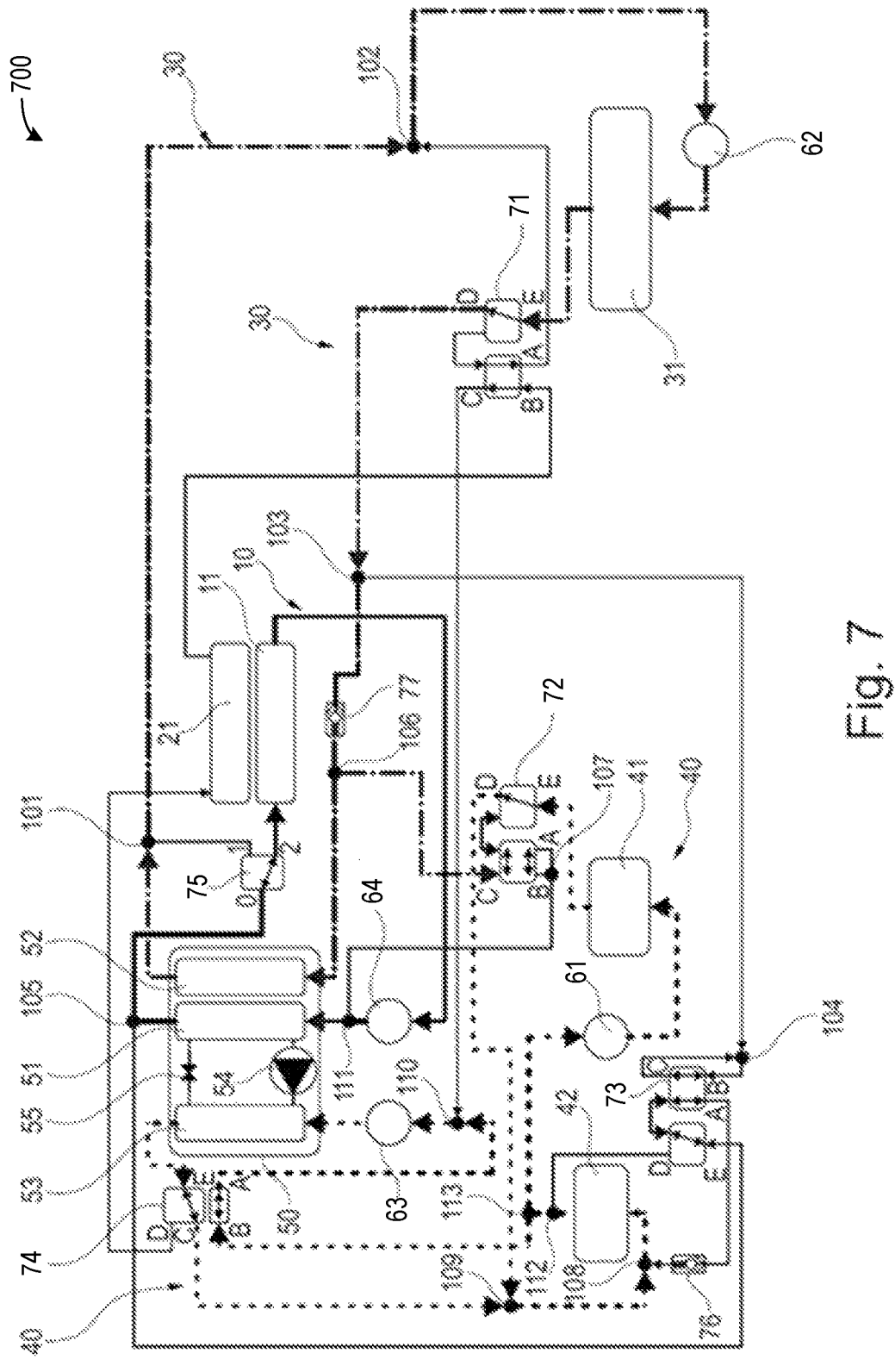
FIG. 7 shows the circuit diagram in a fourth operating state, according to an embodiment of the present disclosure.

Turning now to FIG. 7, it shows a fourth operating state 700. The first control valve 71 is actuated into mode 4, the second control valve 72 is actuated into mode 3, the third control valve 73 is actuated into mode 1, the fourth control valve 74 is actuated into mode 2, and the fifth control valve 75 is actuated into mode 2. A coolant flow passes through the first partial circuit 10 having the cooling device 11 and through the third partial circuit 30 having the battery 31. This may actively cool the vehicle interior and the battery 31. The coolant flow runs in the first partial circuit 10 from the cooling device 11 directly to the first chiller 51 and from there through the fifth control valve 75 to the cooling device 11 again. The coolant flow in the first partial circuit 10 is effected by the fourth pump 64, which is switched on. The coolant flow in the third partial circuit 30 is effected by the second pump 62 and runs from the battery 31 via the first control valve 71 to the second chiller 52 and from there directly back to the battery 31. Furthermore, in the fourth operating state 700, the fourth partial circuit 40 for cooling the components of the power electronics 41 is additionally operated as described in connection with FIG. 6.

In one example, the fourth operating state 700 may be selected in response to an interior cabin cooling request greater than a first threshold cooling request. The first threshold cooling request may be based on a non-zero, positive number. Battery and power electronics cooling are still requested. Active cooling used for provide the interior cabin cooling may also be used to provide the battery cooling and the power electronics cooling. In one example, the battery temperature is greater than the second upper threshold battery temperature.

Figure 8:
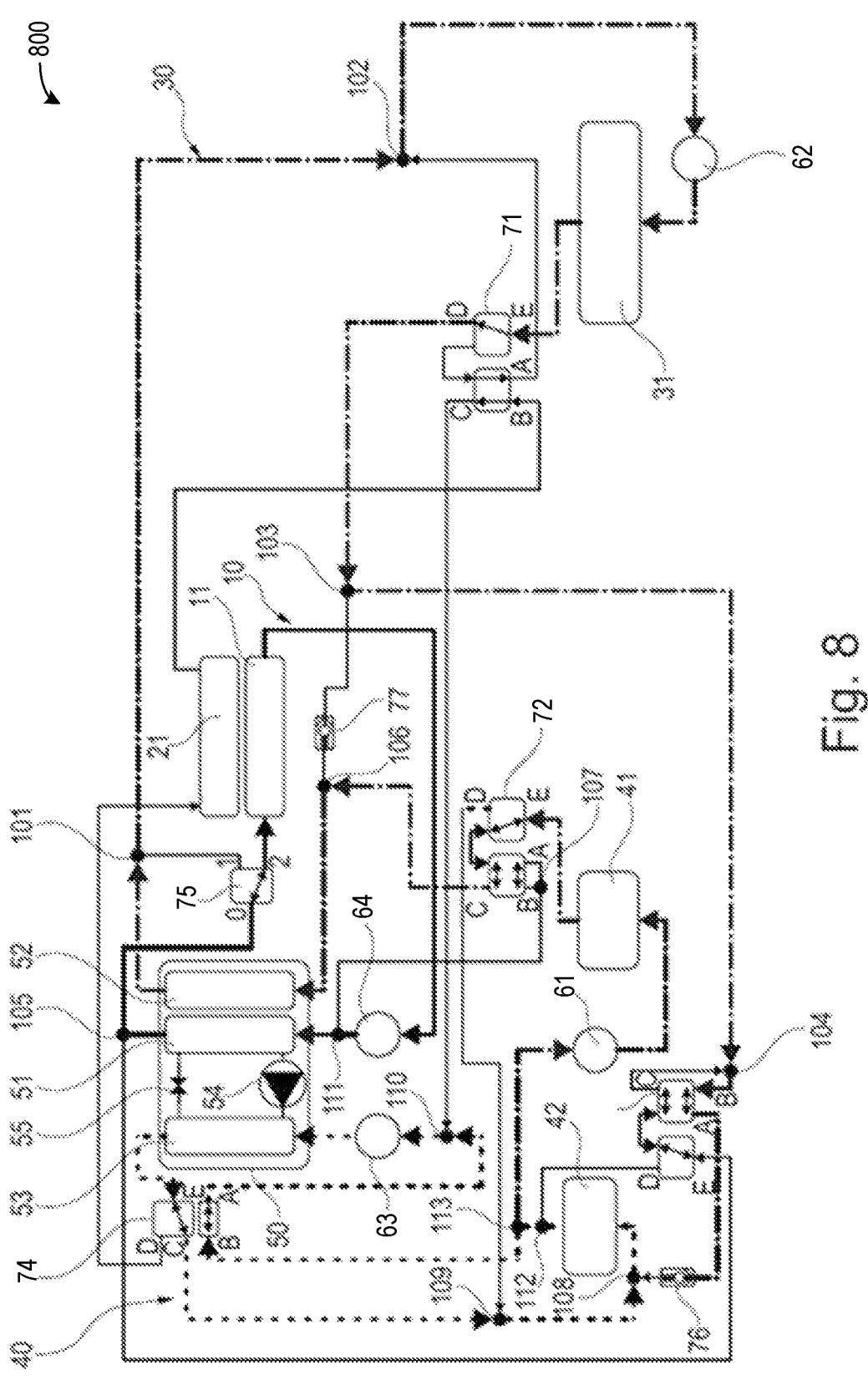
FIG. 8 shows the circuit diagram in a fifth operating state, according to an embodiment of the present disclosure.

Turning now to FIG. 8, it shows a fifth operating state 800. The first control valve 71 is actuated into mode 4, the second control valve 72 is actuated mode 2, the third control valve 73 is actuated into mode 2, the fourth control valve 74 is actuated into mode 2, and the fifth control valve 75 is actuated into mode 2. A coolant flow passes through each of the first partial circuit 10 having the cooling device 11, the third partial circuit 30, and the fourth partial circuit 40 having the battery 31. In this way, the vehicle interior is actively cooled and dehumidified and the battery 31 is cooled both actively (cooling with refrigerant in the primary circuit 50, i.e. chiller 52 is active) and passively (only by the heat exchange device 42). Each of the plurality of pumps (e.g., first through fourth pumps) are switched on in order to drive the flow of the refrigerant.

The flow runs in the first partial circuit 10 from the cooling device 11 directly to the first chiller 51 and from there through the fifth control valve 75 to the cooling device again. The flow in the first partial circuit 10 is effected by the fourth pump 64, which is switched on.

The third and fourth partial circuits 30, 40 are here connected together. The flow of coolant is directed from the battery 31 via the first and third control valves 71, 73 to the heat exchange device 42, from there to the components of the power electronics 41, from there to the second chiller 52 and from there directly to the battery 31 again. In addition, a flow passes through the line that branches downstream of the heat exchange device 42 and that leads via the fourth control valve 74 to the indirect condenser 53, from where the coolant flows through the fourth control valve 74 back to the heat exchange device 42 again.

In one example, the fifth operating state 800 is selected in response to a cabin heating request greater than a first threshold magnitude and the battery temperature being above the second upper threshold battery temperature. The cabin heating may be actively provided via the heating device 21. The indirect condenser 53 may be activated to dehumidify air flowing to the cabin. The battery 31 may be actively cooled along with the power electronics 41.

Figure 9:
FIG. 9 shows the circuit diagram in a sixth operating state, according to an embodiment of the present disclosure.

Turning now to FIG. 9, it shows a sixth operating state 900. The first control valve 71 is actuated into mode 4, the second control valve 72 is actuated into mode 2, the third control valve 73 is actuated into mode 2, the fourth control valve 74 is actuated into mode 1, and the fifth control valve 75 is actuated into mode 2. A coolant flow passes through the first, second and third partial circuits 10, 20, 30 as well as through a portion of the fourth partial circuit 40. In this way, the vehicle interior is heated and ventilated and the battery 31 is cooled. All the pumps have been switched on in order to drive the flow of the coolant.

The flow of the coolant in the first partial circuit 10 is directed from the cooling device 11 directly to the first chiller 51 and from there through the fifth control valve 75 to the cooling device again. The flow in the first partial circuit 10 is effected by the fourth pump 64, which has been switched on.

The flow of the coolant in the second partial circuit 20 is directed from the heating device 21 through the first control valve 71 to the indirect condenser 53 and from there through the fourth control valve 74 to the heating device 21 again. The flow in the second partial circuit 20 is effected by the third pump 63.

The flow of the coolant in the third partial circuit 30 is directed from the battery 31 through the first control valve 71 to the third control valve 73, from there to the heat exchange device 42, from there to the components of the power electronics 41, from there through the second control valve 72 to the second chiller 52 and from there directly to the battery 31 again. The flow is effected by the first and second pumps 61, 62.

In one example, the sixth operating state 900 may be selected in response to a cabin heating request greater than the first threshold magnitude and a battery heating request. The battery heating request may be present in response to the batter temperature being less than a first lower threshold battery temperature. In one example, the first lower threshold battery temperature is less than a lowest temperature of the desired battery operating temperature range.

Figure 10:
FIG. 10 shows the circuit diagram in a seventh operating state, according to an embodiment of the present disclosure.

Tuning now to FIG. 10, it shows a seventh operating state 1000. The first control valve 71 is actuated into mode 2, the second control valve 72 is actuated into mode 1, the third control valve 73 is actuated into mode 1, the fourth control valve 74 is actuated into mode 1, and the fifth control valve 75 is actuated into mode 1. A coolant flow passes through the second, third and fourth partial circuits 20, 30, 40. In this way, the vehicle interior and the battery 31 are heated and the components of the power electronics 41 are cooled. The first, second and third pumps 61, 62 and 63 are switched on.

For heating, the coolant flows from the heating device 21 via the first control valve 71 to the battery and from there to the first control valve 71 again to the indirect condenser 53 and from there, via the fourth control valve 74, to the heating device again. The coolant flow is effected by the second and third pumps 62, 63. A distinction can here be made between two modes, in that in a first mode a fan (not shown) is used and in a second mode it is not used.

A coolant flow is further effected by the first pump 61 from the heat exchange device 42 to the components of the power electronics 41, from there to the second control valve 72. In the region of the second control valve 71, the line of the fourth partial circuit 40 branches in such a manner that the coolant flows through one line directly to the first chiller 51 and through the other line through the second control valve 72 to the second chiller 52. From the second chiller 52, the coolant flows through the fifth control valve 75, downstream of the fifth control valve 75 the corresponding line joins the line coming from the first chiller 51, which then leads via the third control valve 73 to the heat exchange device 42 again.

The seventh operating state 1000 may be selected based on similar conditions to the sixth operating state 900 in that a warm-up of the battery and the interior cabin is requested. However, the heat exchange device 42 is bypassed in the seventh operating state 1000 due to a warm-up request of the power electronics 41.

Figure 11:
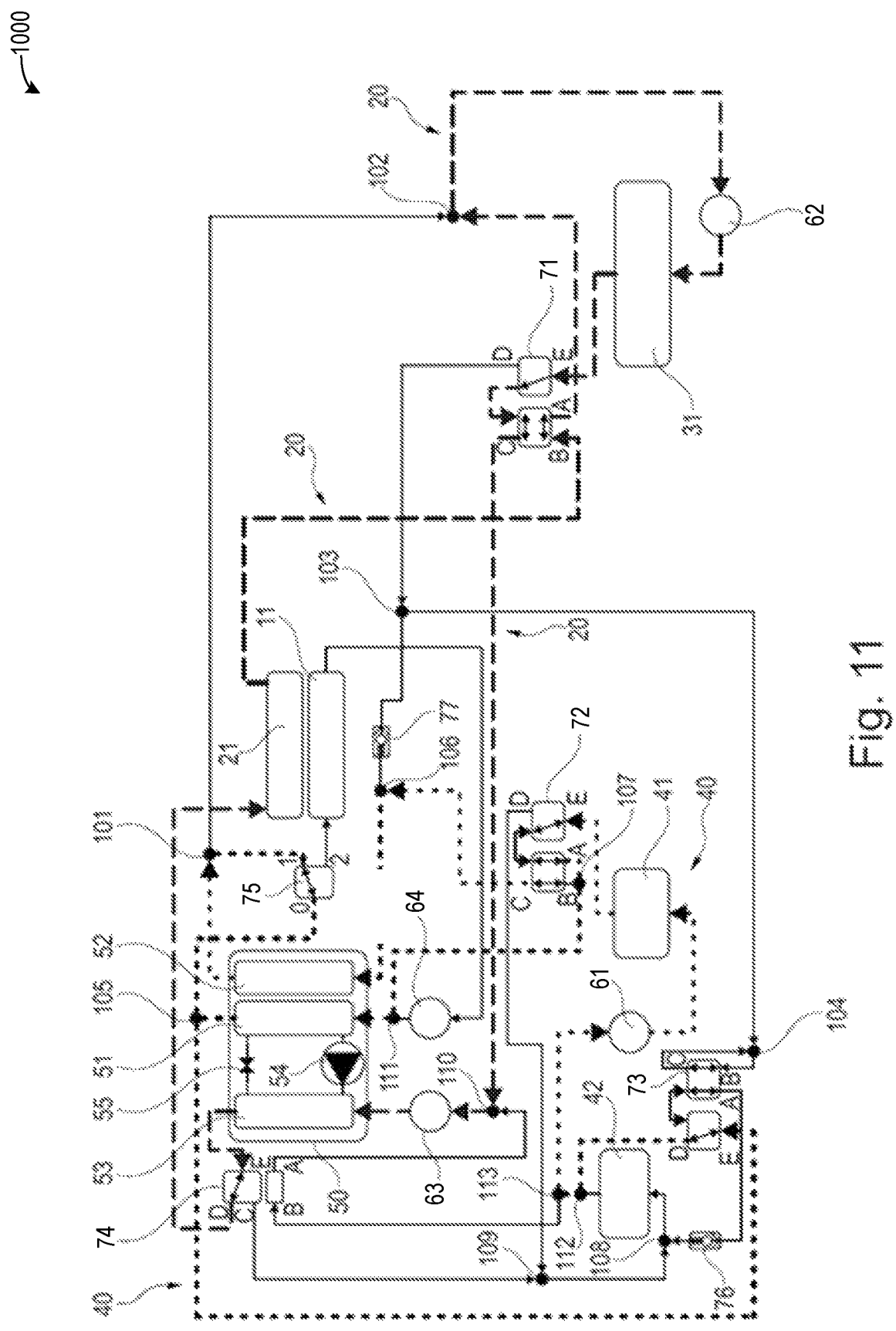
FIG. 11 shows the circuit diagram in an eighth operating state, according to an embodiment of the present disclosure.

Turning now to FIG. 11, it shows an eighth operating state 1100. The first control valve 71 as adjusted into mode 2, the second control valve 72 is adjusted into mode 1, the third control valve 73 is adjusted into mode 4, the fourth control valve 74 is adjusted into mode 1, and the fifth control valve 75 is adjusted into mode 1. A coolant flow passes through the second, third and fourth partial circuits 20, 30, 40. In this way, the vehicle interior and the battery 31 are heated and the components of the power electronics 41 are cooled by the two chillers 51, 52. The first, second and third pumps 61, 62 and 63 have been switched on. Two modes are possible, wherein in one mode the fan of the heat exchange device 41 is switched on and in the other mode it is not.

For heating the battery and the vehicle interior, coolant flows from the heating device 21 via the first control valve 71 to the battery 31 and from there to the first control valve 71 again to the indirect condenser 53 and from there via the fourth control valve 74 to the heating device 21 again. The coolant flow is effected by the second and third pumps 62, 63. A coolant flow passes through the second, third and fourth partial circuits 20, 30, 40.

Coolant further flows from the components of the power electronics 71 via the second control valve 72 to the first and to the second chiller 51, 52, wherein the lines branch in the region of the second control valve, wherein one line branches after passing for a first time through the second control valve 72 and leads directly to the first chiller 51, and the other line, after passing through the second control valve 72 again, leads to the second chiller 52. From the second chiller 52, the coolant flows through the fifth control valve 75, downstream of the fifth control valve 75 the corresponding line joins the line coming from the first chiller 51, which then leads via the third control valve 73, bypassing the heat exchange device 42, to the components of the power electronics 41 again. The flow is effected by the first pump 61. In one example, the eighth operating state 1100 is selected in response to a cabin heating request. During the eighth operating state 1100, waste heat from the battery 31 and the power electronics 41 may be used to provide the cabin heating, which may affect a vehicle economy.

Figure 12:
FIG. 12 shows the circuit diagram in a ninth operating state, according to an embodiment of the present disclosure.

Turning now to FIG. 12, it shows a ninth operating state 1200. The first control valve 71 is adjusted into mode 4, the second control valve 72 is adjusted into mode 1, the third control valve 73 is adjusted into mode 1, the fourth control valve 74 is adjusted into mode 1, and the fifth control valve 75 is adjusted into mode 1. A coolant flow passes through the second, third and fourth partial circuits 20, 30, 40. The vehicle interior is heated via the heating device 21 and waste heat from the battery 31 and the components of the power electronics 41. The first, second and third pumps 61, 62, 63 have been switched on.

Coolant flows in the first partial circuit 20 from the heating device 21 via the first control valve 71 to the indirect condenser 53 and from there via the fourth control valve 74 to the heating device 21 again. In the third partial circuit 30, coolant flows from the battery 31 via the first control valve 71 to the second chiller 52 and from there directly to the battery 31 again. In the fourth partial circuit 40, coolant flows from the components of the power electronics 41 via the second control valve 72 to the first and to the second chiller 51, 52, wherein the lines branch in the region of the second control valve 72, wherein one line branches after passing for a first time through the second control valve 72 and leads directly to the first chiller 51, and the other line, after passing through the second control valve 72 again, leads to the second chiller 52. From the second chiller 52, the coolant flows through the fifth control valve 75, downstream of the fifth control valve 75 the corresponding line joins the line coming from the first chiller 51, which then via the third control valve 73 to the heat exchange device 42 and from there to the components of the power electronics 41 again. The third and fourth partial circuits 30, 40 share a portion of the flow path, the line of the fourth partial circuit 40 that leads to the second chiller 52 merges upstream of the second chiller 52 into the third partial circuit 30 and branches from the third partial circuit 30 again downstream of the second chiller 52.

The ninth operating state 1200 may be similar to the eighth operating state 1100, except that the heat exchange device 42 is bypassed. As such, the cabin heating request may be greater than a second heating magnitude such that meeting the cabin heating request provides sufficient cooling to the battery 31 and the power electronics 41. In one example, the second heating magnitude corresponds to a heating request greater than a heating requested associated with the first heating magnitude.

Figure 13:
FIG. 13 shows the circuit diagram in a tenth operating state, according to an embodiment of the present disclosure.

Turning now to FIG. 13, a tenth operating state 1300. The first control valve 71 is actuated into mode 4, the second control valve 72 is actuated into mode 1, the third control valve 73 is actuated into mode 4, the fourth control valve 74 is actuated into mode 5, and the fifth control valve 75 is actuated into mode 1. The operating state shown is similar to the ninth operating state 1200 of FIG. 12, except that the position of the third control valve 73 is adjusted so that the heat exchange device 42 is bypassed, that is to say is not used. The vehicle interior is heated via the heating device 21 and waste heat from the battery 31 and the components of the power electronics 41 in the tenth operating state 1300. The first, second and third pumps 61, 62, 63 are switched on.

The tenth operating state 1300 may be selected in response to an interior cooling request greater than a second cooling magnitude. The second cooling magnitude may be greater than the first cooling magnitude. As such, the first chiller and the second chiller may be used to meet the cooling request.

Figure 14:
FIG. 14 shows the circuit diagram in an eleventh operating state, according to an embodiment of the present disclosure.

Turning now to FIG. 14, it shows an eleventh operating state 1400. The first control valve 71 is actuated into mode 1, the second control valve 72 is actuated into mode 4, the third control valve 73 is actuated into mode 1, the fourth control valve 74 is actuated into mode 2, and the fifth control valve 75 is actuated into mode 3. A coolant flow passes through the first, third and fourth partial circuits 10, 30, 40. The eleventh operating state 1400 may be a cooling operating state wherein the vehicle interior is cooled using the cooling device 11 and both chillers 51, 52. The components of the power electronics 41 are cooled using the heat exchange device 42. All the pumps are switched on.

In the first partial circuit 10, coolant flows from the cooling device 11 in the direction toward the first chiller 51, wherein the flow path branches downstream of the fourth pump 64 at the node 111, wherein one flow path leads to the first chiller 51 and the second flow path leads via the second control valve 72 to the second chiller 52, the two flow paths merge again downstream of the first and second chillers 51, 52 at the fifth control valve 75 into a common line, which leads from there to the cooling device 11 again during the eleventh operating state. The flow of the coolant is effected by the fourth pump 64.

In the third partial circuit 30, coolant circulates from the battery 31 to the first control valve 71 and from there directly to the battery 31 again. The flow of the coolant is effected by the second pump 62.

In the fourth partial circuit 40, coolant flows from the heat exchange device 42 both to the indirect condenser 53 and to the components of the power electronics 41. To that end, the line branches downstream of the heat exchange device 42 at the node 113. A first line leads directly to the components of the power electronics 41, from there to the second control valve 72 and from there directly to the heat exchange device 42 again. A second line leads via the fourth control valve 74 to the indirect condenser 53 and from there through the fourth control valve 74 again to the heat exchange device 42. The two lines merge again downstream of the heat exchange device 42 at node 109 into a common line. The flow of the coolant is effected by the first and third pumps 61, 63.

Figure 15:
FIG. 15 shows the circuit diagram in a twelfth operating state, according to an embodiment of the present disclosure.

Turning now to FIG. 15, it shows a twelfth operating state 1500. The first control valve 71 is actuated into mode 1, the second control valve 72 is actuated into mode 1, the third control valve 73 is actuated into mode 1, the fourth control valve 74 is actuated into mode 5, and the fifth control valve 75 is actuated into mode 1. A coolant flow passes through the second, third and fourth partial circuits 20, 30, 40. The twelfth operating state 1500 may correspond to a heating state, which includes where the vehicle interior is heated via the heating device 21 and the waste heat of the components of the power electronics 41. The first, second and third pumps 61, 62, 63 have been switched on.

In the second partial circuit 20, coolant flows from the heating device 21 via the first control valve 71 to the indirect condenser 53 and from there via the fourth control valve 74 back to the heating device 21. The flow of the coolant is effected by the third pump 63.

In the third partial circuit 30, coolant circulates from the battery 31 to the first control valve 71 and from there directly to the battery 31 again. The flow of the coolant is effected by the second pump 62.

In the fourth partial circuit 40, coolant flows from the components of the power electronics 41 via the second control valve 72 to the first and to the second chiller 51, 52 (wherein the lines branch in the region of the second control valve 72, wherein one line, after passing for a first time through the second control valve 72, branches at the node 107 and leads directly to the first chiller 51, and the other line, after passing through the second control valve 72 again, leads to the second chiller 52. From the second chiller 52, the coolant flows through the fifth control valve 75; downstream of the fifth control valve 75, the corresponding line joins the line coming from the first chiller 51 at the node 105, from where the coolant flows via the third control valve 73 to the heat exchange device 42 and from there to the components of the power electronics 41 again. The flow of the coolant is effected by the first pump 61.

The twelfth operating state 1500 may be selected in response to a cabin heating request equal to or less than the first heating magnitude. The cabin heating request may be met via waste heat from only the power electronics. Additionally, during the twelfth operating state 1500, the battery temperature is within the desired battery operating temperature range.

TABLE 1

| | | | | | | | | | | | | | | | | | | |
|---|---|---|---|---|---|---|---|---|---|---|---|---|---|---|---|---|---|---|
| | Summary of operating states |

| State | Description | Chiller 1 | Chiller 2 | iCond | HEX | Cabin Heater | Cabin Cooler | PE | Battery | P 1 | IP 2 | IP 3 | IP 4 | V 1 | V 2 | V 3 | V 4 | V 5 |
|---|---|---|---|---|---|---|---|---|---|---|---|---|---|---|---|---|---|---|
| 1 | Fault det | 0 | Batt | 0 | PE | 0 | 0 | F | F | 1 | 1 | 0 | 0 | 4 | 2 | 2 | 1 | 2 |
| 2 | Batt recirc & PE cooling | 0 | 0 | 0 | PE | 0 | 0 | F | F | 1 | 1 | 0 | 0 | 1 | 4 | 1 | 1 | 1 |
| 3 | Batt cool w/ both chillers & PE cooling | Batt | Batt | HEX | PE/ LCC | 0 | 0 | F | F | 1 | 1 | 1 | 0 | 4 | 4 | 1 | 2 | 1 |
| 4 | Cabin and Bat cooling | Cooler | Batt | HEX | PE/ LCC | 0 | F | F | F | 1 | 1 | 1 | 1 | 4 | 3 | 1 | 2 | 2 |
| 5 | Cabin cool and batt act/pas cooling | Cooler | Batt | HEX | PE/ Ch2 | 0 | F | F | F | 1 | 1 | 1 | 1 | 4 | 2 | 2 | 2 | 2 |
| 6 | Cabin heating, dehum, & batt cool | Cooler | Batt | Heater | PE/ Ch2 | F | F | F | F | 1 | 1 | 1 | 1 | 4 | 2 | 2 | 1 | 2 |
| 7 | Cabin and batt warm up | HEX > PE | HEX > PE | Heater | PE | F | 0 | F | F | 1 | 1 | 1 | 0 | 2 | 1 | 1 | 1 | 1 |
| 8 | Cabin and Batt warm up with PE | PE | PE | Heater | 0 | F | 0 | F | F | 1 | 1 | 1 | 0 | 2 | 1 | 4 | 1 | 1 |
| 9 | Cabin heating with battery & PE waste heat (w/ HEX) | HEX > PE | Batt | Heater | PE | F | 0 | F | F | 1 | 1 | 1 | 0 | 4 | 1 | 1 | 1 | 1 |
| 10 | Cabin heating with battery & PE waste heat (w/o HEX) | PE | Batt | Heater | PE | F | 0 | F | F | 1 | 1 | 1 | 0 | 4 | 1 | 4 | 1 | 1 |
| 11 | Cabin max cool & battery recirc | Cooler | Cooler | HEX | PE/ iCond | 0 | F | F | F | 1 | 1 | 1 | 1 | 1 | 4 | 1 | 2 | 3 |
| 12 | Cabin heating & batt recirc | PE > HEX | PE > HEX | Heater | PE | F | 0 | F | F | 1 | 1 | 1 | 0 | 1 | 1 | 1 | 1 | 1 |

A summary of the first through twelfth operating states is shown in table 1 above. The letter "F" in the table indicates if a corresponding component is receiving coolant flow and the number "0" indicates if the corresponding component is not receiving flow. The numbers "1" and "0" with respect to the pumps (e.g., P1-P4) indicate if the pump is on or off, respectively.

In one example, a coolant system for a vehicle, comprises a primary circuit comprising a first chiller, a second chiller, and at least one indirect condenser, a secondary circuit comprising a first partial circuit having a cabin cooling device, a second partial circuit having a cabin heating device, a third partial circuit comprising a battery, and a fourth partial circuit comprising a heat exchange device and power electronics, a plurality of valves arranged in the system including a battery valve (e.g., first valve 71), a power electronics valve (e.g, second valve 72), a heat exchange device valve (e.g., third valve 73), an indirect condenser valve (e.g., fourth valve 74), and a chiller valve (e.g., fifth valve 75), and a controller with instructions stored on memory thereof that allow the controller to: control positions of the plurality of valves to enter one of a plurality of operating states based on a temperature of one or more of the battery, the power electronics, and a cabin interior. The battery, power electronics, and heat exchange device valves are identical, and wherein the indirect condenser and chiller valves are different from one another and the battery, power electronics, and heat exchange device valves.

The coolant system may further include a plurality of pumps comprising a first pump arranged between the heat exchange device and the power electronics, a second pump arranged between the first control valve and the battery, a third pump arranged between the fourth control valve and the indirect condenser, and a fourth pump arranged between the first control valve and the first chiller.

The battery valve may be configured to control fluid flow through one or more of the second and third partial circuits. The power electronics valve is configured to control fluid flow through one or more of the first and the fourth partial circuits. The heat exchange valve is configured to control fluid flow through one or more of the third and fourth partial circuits. The indirect condenser valve is configured to control fluid flow through one or more of the second and fourth partial circuits. The chiller valve is configured to control fluid flow through one or more of the first and fourth partial circuits.

In some examples, additionally or alternatively, a system includes a primary circuit comprising a first chiller, a second chiller, and at least one indirect condenser, a secondary circuit comprising a first partial circuit having a cabin cooling device, a second partial circuit having a cabin heating device, a third partial circuit comprising a battery, and a fourth partial circuit comprising a heat exchange device and power electronics, a plurality of valves arranged in the system including a battery valve, a power electronics valve, a heat exchange device valve, an indirect condenser valve, and a chiller valve, and a controller with instructions stored on memory thereof that allow the controller to select one of a plurality of operating states in response to a temperature of the battery, a temperature of the power electronics, a cabin heating request, and a cabin cooling request, wherein at least one operating state of the plurality of operating states comprise cooling the battery and the power electronics by utilizing waste heat therefrom to meet the cabin heating request.

The heat exchange device is bypassed via a position of the heat exchange device valve during the at least one operating state. A number of the plurality of valves is less than half a number of operating states. In one example, a number of the plurality of valves is exactly five, and wherein a number of the plurality of operating states is at least twelve. The battery valve, the power electronics valve, and the heat exchange device valve comprise at least seven ports.

A further operating state, different than that at least one operating state, may include where the third partial circuit is fluidly separated from the fourth partial circuit.

In further embodiments, a thermal management system of a vehicle comprising a battery operated to propel the vehicle, the thermal management system including a first plurality of valves comprising a first number of ports, a second plurality of valves less than the first number of ports; and a controller with computer readable instructions stored on non-transitory memory thereof that when executed cause the controller to select an operating state of a plurality of operating states based on one or more a temperature of the battery, a temperature of power electronics, a cabin heating request, and a cabin cooling request and actuate a position of one or more of the first plurality of valves and the second plurality of valves based on the operating state. A number of the first plurality of valves is greater than a number of the second plurality of valves. A number of the plurality of operating states is at least twice a sum of a number of the first plurality of valves and a number of the second plurality of valves. The first plurality of valves and the second plurality of valves are arranged along and configured to control coolant through four different coolant circuits. The first plurality of valves comprises four different positions, and wherein the second plurality of valves comprise at least two positions. In one example, the first plurality of valves includes the first, second, and third control valves 71, 72, 73 and the second plurality of valves includes the fourth control valve 74 and the fifth control valve 75.

In this way, a thermal management system includes a plurality of valves configured to provide a plurality of operating states. In one example, a number of operating states is at least twice as many as a number of valves. Additionally or alternatively, the number of valves is less than half the number of operating states. By doing this, manufacturing effort is reduced and a longevity of the thermal management system is increased due to fewer parts.

Each of the plurality of valves may include multiple ports for influencing the flow of coolant through the different circuits. The valves may include three or more ports. For example, the first control valve may include seven ports. The second control valve may include seven ports. The third control valve may include seven ports. The fourth control valve may include five ports. The fifth control valve may include three ports. The valves may be multi-way valves configured to fluidly couple one or more of their corresponding ports to achieve a selected operating state. A plurality of pumps may be arranged within the thermal management system and configured to promote coolant flow in a determined direction. Selection of the operating states and therefor operation of the valves and pumps may be based on a temperature of one or more of the battery, the components of the power electronics, and an interior cabin.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A thermal management system for a vehicle, comprises:
a primary circuit comprising a first chiller, a second chiller, and at least one indirect condenser;
a secondary circuit comprising a first partial circuit having a cabin cooling device, a second partial circuit having a cabin heating device, a third partial circuit comprising a battery, and a fourth partial circuit comprising a heat exchange device and power electronics;
a plurality of valves including a battery valve, a power electronics valve, a heat exchange device valve, an indirect condenser valve, and a chiller valve; and
a controller with instructions stored on memory thereof that allow the controller to:
control positions of the plurality of valves to enter one of a plurality of operating states based on a temperature of one or more of the battery, the power electronics, and a cabin interior.

2. The thermal management system of claim 1, wherein the battery, power electronics, and heat exchange device valves are identical, and wherein the indirect condenser and chiller valves are different than the battery valve, the power electronics valve, and the heat exchange device valve.

3. The thermal management system of claim 1, further comprising a plurality of pumps comprising a first pump arranged between the heat exchange device and the power electronics, a second pump arranged between the battery valve and the battery, a third pump arranged between the indirect condenser valve and the indirect condenser, and a fourth pump arranged between the battery valve and the first chiller.

4. The thermal management system of claim 1, wherein the battery valve is configured to control fluid flow through one or more of the second and third partial circuits.

5. The thermal management system of claim 4, wherein the power electronics valve is configured to control fluid flow through one or more of the first and the fourth partial circuits.

6. The thermal management system of claim 5, wherein the heat exchange valve is configured to control fluid flow through one or more of the third and fourth partial circuits.

7. The thermal management system of claim 6, wherein the indirect condenser valve is configured to control fluid flow through one or more of the second and fourth partial circuits.

8. The thermal management system of claim 7, wherein the chiller valve is configured to control fluid flow through one or more of the first and fourth partial circuits.

9. A system, comprising:
a primary circuit comprising a first chiller, a second chiller, and at least one indirect condenser;
a secondary circuit comprising a first partial circuit having a cabin cooling device, a second partial circuit having a cabin heating device, a third partial circuit comprising a battery, and a fourth partial circuit comprising a heat exchange device and power electronics;
a plurality of valves arranged in the system including a battery valve, a power electronics valve, a heat exchange device valve, an indirect condenser valve, and a chiller valve; and
a controller with instructions stored on memory thereof that allow the controller to:
select one of a plurality of operating states in response to a temperature of the battery, a temperature of the power electronics, a cabin heating request, and a cabin cooling request, wherein at least one operating state of the plurality of operating states comprise cooling the battery and the power electronics by utilizing waste heat therefrom to meet the cabin heating request.

10. The system of claim 9, wherein the heat exchange device is bypassed via a position of the heat exchange device valve during the at least one operating state.

11. The system of claim 9, wherein a number of the plurality of valves is less than half a number of operating states of the system.

12. The system of claim 9, wherein a number of the plurality of valves is exactly five, and wherein a number of the plurality of operating states is at least twelve.

13. The system of claim 9, further comprising a further operating state different than that at least one operating state, wherein the further operating state comprises where the third partial circuit is fluidly separated from the fourth partial circuit.

14. The system of claim 9, wherein the battery valve, the power electronics valve, and the heat exchange device valve comprise at least seven ports.

15. The system of claim 9, further comprising a compressor fluidly coupling the first chiller to the at least one indirect condenser.

16. A thermal management system of a vehicle comprising a battery operated to propel the vehicle, the thermal management system, comprising:

a first plurality of valves comprising a first number of ports;

a second plurality of valves less than the first number of ports, and wherein the first plurality of valves and the second plurality of valves are arranged along and configured to control coolant through four different coolant circuits; and a controller with computer readable instructions stored on non-transitory memory thereof that when executed cause the controller to:

select an operating state of a plurality of operating states based on one or more a temperature of the battery, a temperature of power electronics, a cabin heating request, and a cabin cooling request; and actuate a position of one or more of the first plurality of valves and the second plurality of valves based on the operating state.

17. The thermal management system of claim 16, wherein a number of the first plurality of valves is greater than a number of the second plurality of valves.

18. The thermal management system of claim 16, wherein a number of the plurality of operating states is at least twice a sum of a number of the first plurality of valves and a number of the second plurality of valves.

19. The thermal management system of claim 16, wherein each of the first plurality of valves comprises four different positions, and wherein each of the second plurality of valves comprises at least two positions.

\*  \*  \*  \*  \*